UNITED STATES PATENT OFFICE.

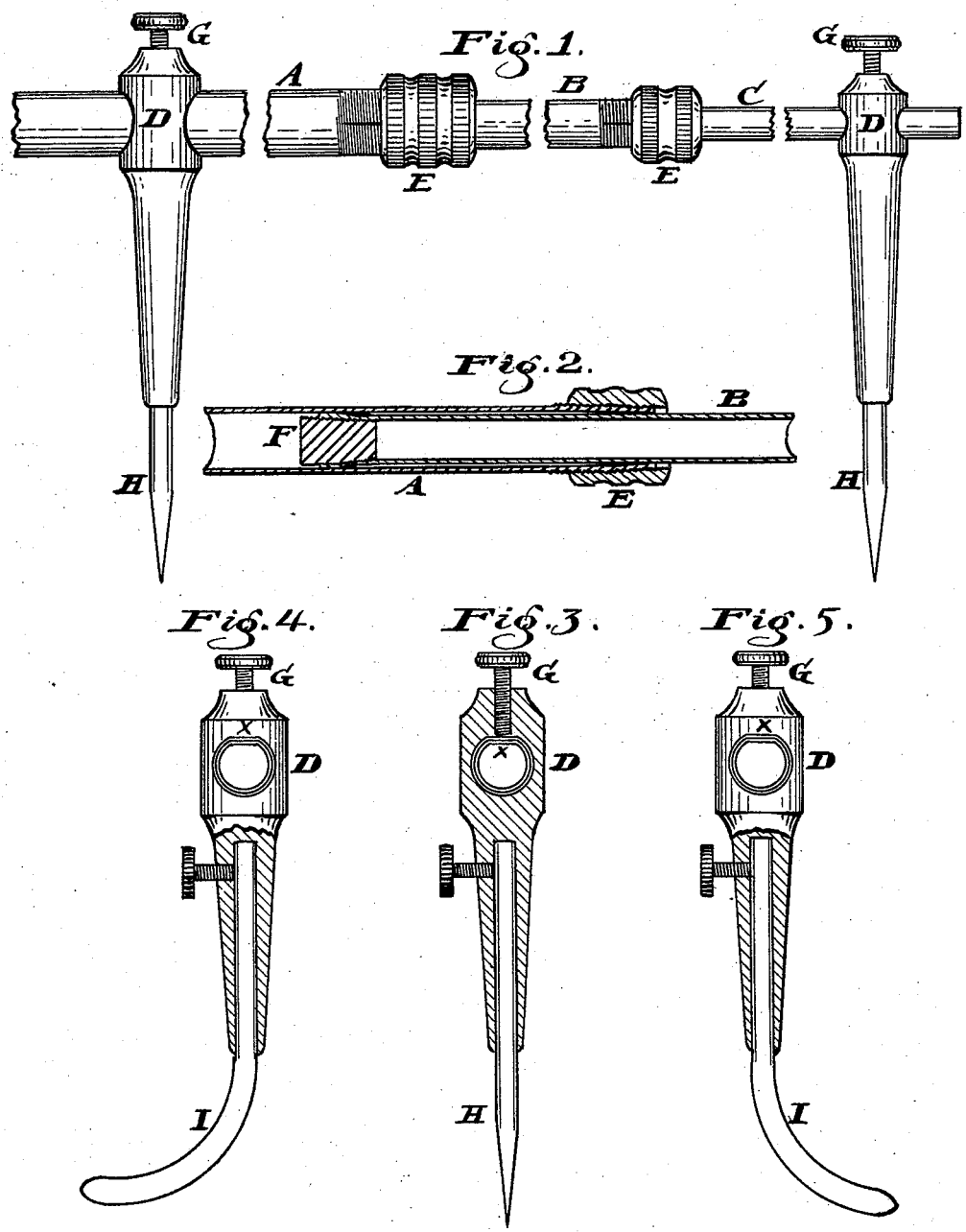

CHRISTIAN F. HEINKEL AND GOTTLIEB WEBER, OF CLEVELAND, OHIO.

BEAM-COMPASS.

SPECIFICATION forming part of Letters Patent No. 534,152, dated February 12, 1895.

Application filed May 26, 1894. Serial No. 512,580. (No model.)

*To all whom it may concern:*

Be it known that we, CHRISTIAN F. HEINKEL and GOTTLIEB WEBER, citizens of the United States, and residents of Cleveland, county of Cuyahoga, and State of Ohio, have invented certain new and useful Improvements in Beam-Compasses, of which the following is a specification.

This invention relates to improvements in beam compasses having for its object to provide an easily adjusted and accurately working device capable of use as calipers, and consists in the construction of a telescopic beam with adjustable centering, marking and caliper points, substantially as hereinafter described and pointed out in the claim.

In the accompanying drawings Figure 1 represents a side elevation of our new beam compass with the beam broken to show the principal parts in full size. Fig. 2 is a longitudinal section of the beam showing the method of binding the parts of the beam together when adjusted. Fig. 3 is a vertical section of one of the points and clamp. Figs. 4 and 5 are point clamps showing caliper points substituted for the pin points.

A, B and C represent the three parts of the telescopic beam, and D D are the point clamps.

E E are clamping nuts having tapering screw-threaded interiors which screw onto the tapered screw-threaded and split ends of the parts A and B, whereby said split ends are contracted, when the nuts are turned up and clamp them onto the parts within the said split ends. The inner ends of the parts B and C are also split and are internally screw-threaded, and expanded by a screw-threaded plug F, for the purpose of making a close fit and thus make a stiff joint which will maintain the beam, when extended in a straight line.

The upper sides of the tubular parts A B and C are slightly flattened as seen at $x$ Figs. 3, 4 and 5. This is for preventing the tubes turning in one another, and keeps them in alignment, as well as keeping the point clamps in parallel position.

G G are thumb screws for fastening the point clamps in position. The point clamps are hollow and carry the pin points H or caliper points I.

From the foregoing it will be seen that this makes a readily adjusted beam compass or calipers readily adapted to varying lengths, and when not in use may be closed up together in a compact form convenient for carrying or storing.

Having described our invention, we claim—

The improved adjustable beam compass, consisting of the tubular telescopic parts A, B, C, having tapering screw-threaded and split ends, tapering nuts on said split ends adapted to clamp said parts A B and C; the internally screw threaded and split inner ends, tapering plugs F in said split ends, and the adjustable pin and caliper point clamps D D, combined and adapted to operate substantially as described.

CHRISTIAN F. HEINKEL.
GOTTLIEB WEBER.

Witnesses:
GEO. W. TIBBITTS,
K. K. ATWATER.